US012638377B2

(12) United States Patent
Zahrt

(10) Patent No.: US 12,638,377 B2
(45) Date of Patent: May 26, 2026

(54) TEST CHAMBER AND METHOD

(71) Applicant: Weiss Technik GmbH, Reiskirchen (DE)

(72) Inventor: Yannik Zahrt, Rabenau (DE)

(73) Assignee: Weiss Technik GmbH, Reiskirchen (DE)

( * ) Notice: Subject to any disclaimer, the term of this patent is extended or adjusted under 35 U.S.C. 154(b) by 246 days.

(21) Appl. No.: 18/228,079

(22) Filed: Jul. 31, 2023

(65) Prior Publication Data

US 2024/0044775 A1 Feb. 8, 2024

(30) Foreign Application Priority Data

Aug. 2, 2022 (EP) .................................... 22188400

(51) Int. Cl.
| | |
|---|---|
| *G01N 17/00* | (2006.01) |
| *F24F 11/84* | (2018.01) |
| *G01M 99/00* | (2011.01) |
| *F25B 9/00* | (2006.01) |
| *F25B 41/20* | (2021.01) |

(Continued)

(52) U.S. Cl.
CPC ............ G01N 17/002 (2013.01); F24F 11/84 (2018.01); G01M 99/002 (2013.01)

(58) Field of Classification Search
CPC .... G01N 17/002; F24F 11/84; G01M 99/002; F25B 41/22; F25B 2400/19; F25B 2700/197; F25B 49/02; F25B 2500/222;

F25B 2600/2525; F25B 9/002; F25B 41/20; F25B 41/30; F25B 41/37; F25B 41/40; F25B 43/02; F25B 49/022
See application file for complete search history.

(56) References Cited

U.S. PATENT DOCUMENTS

| | | | |
|---|---|---|---|
| 4,964,281 A | 10/1990 | Tanaka | |
| 5,018,361 A | * 5/1991 | Kroll | .......................... B09B 3/00 |
| | | | 62/85 |

(Continued)

FOREIGN PATENT DOCUMENTS

| | | | | |
|---|---|---|---|---|
| CN | 109060391 A | * 12/2018 | .......... | G01M 99/008 |
| CN | 113607448 A | * 11/2021 | .......... | G01M 99/002 |

(Continued)

*Primary Examiner* — Laura Martin
*Assistant Examiner* — Anthony W Megna Fuentes
(74) *Attorney, Agent, or Firm* — Quarles & Brady LLP

(57) ABSTRACT

A method and a test chamber for conditioning air, in which the test chamber comprises a temperature-insulated test space, which is closable to an environment and serves for receiving test material, and a temperature control device for controlling the test space in temperature, a temperature ranging from −40° C. to +180° C. being generable within the test space by the temperature control device. The temperature control device comprises a heating apparatus and a cooling apparatus having a cooling cycle, the cooling cycle having a refrigerant, a heat exchanger disposed in the test space, a compressor, a condenser and an expansion element, the refrigerant being a hydrocarbon or a refrigerant mixture made of hydrocarbons. A stop element is disposed in the cooling cycle downstream of the heat exchanger and upstream of the compressor, the stop element being able to stop reflux of refrigerant in the heat exchanger in the opposite direction of flow.

11 Claims, 2 Drawing Sheets

(51) Int. Cl.

| | |
|---|---|
| *F25B 41/22* | (2021.01) |
| *F25B 41/30* | (2021.01) |
| *F25B 41/37* | (2021.01) |
| *F25B 41/40* | (2021.01) |
| *F25B 43/02* | (2006.01) |
| *F25B 49/02* | (2006.01) |

(56) References Cited

U.S. PATENT DOCUMENTS

| | | | |
|---|---|---|---|
| 6,105,375 A | 8/2000 | Takano et al. | |
| 8,316,657 B2 | 11/2012 | Lifson | |
| 8,875,528 B2* | 11/2014 | Immink | F25B 41/20 |
| | | | 236/12.1 |
| 10,684,052 B2 | 6/2020 | Walser et al. | |
| 2019/0383524 A1* | 12/2019 | Haack | F25B 49/02 |

FOREIGN PATENT DOCUMENTS

| | | | |
|---|---|---|---|
| DE | 102020130063 A1 | 5/2022 |
| EP | 0344397 A2 | 12/1989 |
| WO | 2019048250 A1 | 3/2019 |

* cited by examiner

TEST CHAMBER AND METHOD

This patent application claims priority of the European Patent Application No. 22188400.0 filed on Aug. 2, 2022, the disclosure of which is incorporated herein by reference.

The invention relates to a method and a test chamber for conditioning air, in particular a climate chamber or the like, the test chamber comprising a temperature-insulated test space, which is closable to an environment and serves for receiving test material, and a temperature control device for controlling the test space in temperature, a temperature ranging from –40° C. to +180° C. being generable within the test space by means of the temperature control device, the temperature control device comprising a heating apparatus and a cooling apparatus having a cooling cycle, the cooling cycle having a refrigerant, a heat exchanger disposed in the test space, a compressor, a condenser and an expansion element, the refrigerant being a hydrocarbon or a refrigerant mixture made of hydrocarbons.

Test chambers of this kind are commonly used for observing physical and/or chemical properties of objects, in particular devices. Temperature test consoles or climate test consoles are thus known, within which temperatures ranging from –40° C. to +180° C. can be set. In climate test consoles, desired climate conditions can be additionally set, to which the device and/or the test material is exposed over a defined period of time. A temperature of the test space receiving the test material to be tested is regularly controlled in a circulating-air channel within the test space. The circulating-air channel forms an air-treatment space in the test space, heat exchangers for heating or cooling the air flowing through the circulating-air channel and/or the test space being disposed in the air-treatment space. In this context, a fan suctions the air present in the test space and conducts it in the circulating-air channel to the corresponding heat exchangers. The temperature of the test material can be controlled thus or even be subjected to a defined change in temperature. During a test interval, a temperature can change between a temperature maximum and a temperature minimum of the test chamber, for example. A test chamber of this kind is known from EP 0 344 397 A2, for example.

The refrigerant used in a cooling cycle should have a relative low $CO_2$ equivalent, i.e., a relative greenhouse potential or Global Warming Potential (GWP) should be as low as possible in order to avoid indirectly damaging the environment via the refrigerant upon its release. While it is also known to use hydrocarbons as refrigerant, it is, however, disadvantageous that hydrocarbons are easily inflammable. Inflammability is understood as the property of the refrigerant to react with ambient oxygen while releasing heat. A refrigerant is inflammable in particular when it falls under fire class C according to European standard DN 2 or DIN 378 classes A2, A2L and A3 in the version valid on the day of priority. If an inflammable refrigerant is used, a filling, a shipment and an operation of a cooling cycle and/or of a test chamber is complicated because of the security measures to be maintained. A significant problem is a possible leakage of the cooling cycle within the test space, in which electric resistance heaters and also electrically operated devices can be present as test material. In the event of a leakage, an explosion can be the result.

As a result of statutory provisions, a refrigerant must not significantly contribute to the ozone depletion in the atmosphere or to global warming. Hence, essentially no fluorinated gases or fluorinated substances are to be used as refrigerants, for which reason natural refrigerants, such as carbon dioxide ($CO_2$), are considered. A disadvantage of refrigerants of this kind with low GWP is that these refrigerants have a partially significantly lower cooling performance in comparison to refrigerants having comparatively higher GWPs in the temperature ranges relevant for a cooling cycle. A lower GWP can be attained with refrigerant mixtures, which have a comparatively high mass fraction of carbon dioxide, these refrigerant mixtures being able to have zeotropic properties because of the different substances mixed with each other, which in turn is not desired in most cooling cycles. Moreover, a fraction of carbon dioxide must be large enough that the refrigerant is nonflammable. From WO 2019/048250 A1, a test chamber having a refrigerant is known, which consists essentially of carbon dioxide, pentafluoroethane and difluoromethane. A disadvantage in this case is that supercooling the refrigerant by means of an internal heat exchanger in a cooling cycle is required to attain particularly low temperatures. Further, the refrigerant has zeotropic properties and contains fluorinated gases as components.

The object of the invention at hand is therefore to propose a test chamber and a method for conditioning air by means of a test chamber, both the test chamber and the method ensuring safe operation of the test chamber using hydrocarbons as a refrigerant.

This object is attained by a test chamber as disclosed herein and a method as disclosed herein.

The test chamber for conditioning air, in particular a climate chamber or the like, comprises a temperature-insulated test space, which is closable to an environment and serves for receiving test material, and a temperature control device for controlling the test space in temperature, a temperature ranging from –40° C. to +180° C. being generable within the test space by means of the temperature control device, the temperature control device comprising a heating apparatus and a cooling apparatus having a cooling cycle, the cooling cycle having a refrigerant, a heat exchanger disposed in the test space, a compressor, a condenser and an expansion element, the refrigerant being a hydrocarbon or a refrigerant mixture made of hydrocarbons, a stop element being disposed in the cooling cycle downstream of the heat exchanger and upstream of the compressor, the stop element being able to stop a reflux of refrigerant in the heat exchanger in the opposite direction of flow.

Using the test chamber according to the invention, it is possible to safely use a hydrocarbon or a refrigerant mixture made of hydrocarbons as a refrigerant in the cooling cycle. During operation of the cooling apparatus and/or when cooling the compressed refrigerant via the heat exchanger disposed therein, the compressed refrigerant is dosed and/or expanded in the heat exchanger via the expansion element, whereby a temperature of the heat exchanger is lowered. The compressor, which is disposed downstream of the heat exchanger in a flow direction of the refrigerant, suctions the refrigerant from what is known as a low-pressure side of the cooling cycle and compresses it on what is known as a high-pressure side of the cooling cycle. If, in the scope of a test sequence, a higher temperature is to be generated in the test space, the air of the test space is heated by the heating apparatus. For this purpose, the heat exchanger and the refrigerant contained therein are heated, whereby a heat expansion of the refrigerant in the heat exchanger is the result. Likewise, the refrigerant is not required in the heat exchanger, as the heat exchanger and/or the test space are not cooled at the same time during a phase of heating the test space. Refrigerant could moreover reflux to the heat exchanger via a possible pressure compensation between the high-pressure side and the low-pressure side of the cooling cycle, e.g., via a bypass, which extends between the high-pressure side and the low-pressure side and can have a valve, a magnet valve, a throttling element and/or a pressure-compensation capillary. Since the stop element, by means of which a reflux of refrigerant to the heat exchanger in the opposite direction of flow of refrigerant can be stopped, is disposed downstream of the heat exchanger and upstream of the compressor in the cooling cycle, this possible reflux of refrigerant can be prevented in the heat exchanger. Should a leakage of the heat exchanger occur where inflammable refrigerant can enter the test space, the amount of the refrigerant flowing to the test space would be comparatively low, as the remaining refrigerant in the cooling cycle could not enter the heat exchanger and consequently the test space via a reflux. By means of the stop element, it becomes possible to design the test chamber significantly more safely and to make inflammable refrigerant and/or hydrocarbons utilizable as a refrigerant for the test chamber.

The refrigerant can be inflammable and/or free of fluorinated hydrocarbons. For instance, the refrigerant can be propane, ethane, ethylene, propene, isobutene, butane or the like. The refrigerant can also be a refrigerant mixture made of hydrocarbons and/or the components mentioned above or a refrigerant mixture having mostly hydrocarbons. Further, the refrigerant can be free of fluorinated hydrocarbons. This makes it possible to fulfill future regulatory requirements to refrigerants and to avoid the disadvantages of fluorinated hydrocarbons. The refrigerant can also be suitable to generate a temperature ranging from −40° C. to +180° C., preferably −70° C. to +180° C., particularly preferably −85° C. to +200° C., within the test space.

The stop element can be disposed directly downstream of the heat exchanger in the cooling cycle. Consequently, no other pipe, no valve of the cooling cycle or the like can be connected between the stop element and the heat exchanger in a pipe section of the cooling cycle extending between the heat exchanger and the stop element. Thus, a reflux of refrigerant can be safely avoided in the heat exchanger, from other pipes of the cooling cycle if required.

Advantageously, the stop element can be a non-return valve. The non-return valve can be disposed such in the cooling cycle that refrigerant can flow in the direction of flow to the compressor from the heat exchanger via the non-return valve, albeit not in the opposite direction. A reflux of refrigerant in the heat exchanger can thus be prevented using simple and inexpensive means. Even when refrigerant expands in the heat exchanger, refrigerant can still flow from the heat exchanger via the non-return valve when an expansion element is closed, whereby an amount or mass of refrigerant can be further reduced in the heat exchanger.

Alternatively, the stop element can be a magnet valve, a bypass having a pressure relief valve being able to be disposed in the cooling cycle, the bypass being able to be connected downstream of the heat exchanger and upstream of the magnet valve as well as downstream of the magnet valve and upstream of the compressor. If the expansion element is closed, the magnet valve can also be closed, meaning no refrigerant can reflux to the heat exchanger against the direction of flow. Should the refrigerant be heated within the heat exchanger, an amount of refrigerant can flow upstream of the compressor from the heat exchanger via the pressure relief valve and/or the bypass. A reflux of refrigerant in the heat exchanger is not possible via the pressure relief valve, as a pressure in the heat exchanger is comparatively larger than a pressure in the cooling cycle upstream of the compressor. Even in the event that the magnet valve malfunctions and/or the magnet valve cannot be opened, too much refrigerant can be prevented from entering the heat exchanger when the expansion element opens and a pressure can be prevented from increasing in the heat exchanger in an undesired manner. In this event, the heat exchanger could fill with liquid refrigerant, which could not drain via the expansion element or the magnet valve. This undesired operating state is then prevented by the pressure relief valve, which can open upon an inadmissible pressure increase within the heat exchanger and allows refrigerant to flow past the magnet valve upstream of the compressor on the low-pressure side.

The cooling cycle can have a pressure compensation pipe, which can extend between a high-pressure side and a low-pressure side of the cooling cycle, a magnet valve being able to be disposed in the pressure compensation pipe. By means of the pressure compensation pipe, it becomes possible to compensate pressure between the high-pressure side and the low-pressure side when the compressor is not in operation. The pressure compensation pipe can be connected to the high-pressure side of the cooling cycle directly downstream of the compressor and upstream of the condenser and/or upstream of the condenser and upstream of the expansion element and can open in the cooling cycle on the low-pressure side upstream of the compressor. When refrigerant expands as a result of the compressor not being in operation, it becomes possible to compensate pressure between the high-pressure side and the low-pressure side. Simultaneously, the pressure compensation pipe can also be used for regulating a suction pressure and a refrigerant temperature upstream of the compressor.

The temperature control device can comprise a regulator having at least one pressure sensor in the cooling cycle, the pressure sensor being able to be disposed downstream of the expansion element and upstream of the stop element, the regulator stopping the expansion element and continuing the operation of the compressor as a function of a measured pressure. By means of the pressure sensor, it becomes possible to measure and/or determine the pressure of the refrigerant in the heat exchanger. This enables lowering the pressure of the refrigerant in the heat exchanger by continuing the operation of the compressor, even if the expansion element is stopped. If the compressor suctions refrigerant, even more refrigerant can be removed from the heat exchanger, meaning an amount of refrigerant being able to be reduced even further in the heat exchanger. The operation of the compressor can be continued as long as, for example, a desired pressure is produced in the heat exchanger. Alternatively, it is possible to intend a stopping time of the compressor in order to remove refrigerant from the heat exchanger after closing the expansion element.

The test chamber can comprise a detector having at least one gas sensor and a ventilation installation in an engine room of the test chamber separated from the test space in an airtight manner. Using the detector, it becomes possible in the event of a leakage of the cooling cycle to identify the leakage via the gas sensor and to vent the engine room by means of the ventilation installation. Since the cooling cycle can be disposed mostly in the engine room, refrigerant can also enter the engine room. The gas sensor can be disposed at a lowest possible position in the engine room so that possibly leaking hydrocarbon or refrigerant can be detected as quickly as possible. To prevent an evaporation of leaking refrigerant in the engine room, possible openings in the engine room can be formed above the gas sensor, for example 10 cm above the gas sensor. This ensures that leaking hydrocarbon, which naturally collects at a bottom of the engine room owing to its large density, can be safely detected by means of the gas sensor. Further, it can be intended that the ventilation installation is disposed directly at the bottom of the engine room. The ventilation installation can be formed by an ATEX-certified fan. The fan can then be operated if the gas sensor detects hydrocarbons. A vent pipe of the fan can extend outside of the engine room of the test chamber.

In the method for conditioning air in a temperature-insulated test space of a test chamber, in particular a climate chamber or the like, the test space being closable to an environment and serving to receive test material, a temperature ranging from −40° C. to +180° C. is generated within the test space by means of a temperature control device of the test chamber, a temperature being generated within the test space by means of a cooling device of the temperature control device having a heating apparatus, and the cooling cycle having a refrigerant, a heat exchanger disposed in the test space, a compressor, a condenser and an expansion element, the refrigerant being a hydrocarbon or a refrigerant mixture made of hydrocarbons, a reflux of refrigerant in the heat exchanger in the opposite direction of flow being prevented by a stop element disposed in the cooling cycle downstream of the heat exchanger and upstream of the compressor. Reference is made to the description of advantages of the test chamber according to the invention regarding the advantageous effects of the method according to the invention.

The expansion element can be stopped by means of a regulator of the temperature control device and a temperature of +50° C. to +180° C. can be generated within the test space by means of the heating apparatus. The regulator consequently can be used to close the expansion element and thus to stop a flow of refrigerant through the heat exchanger. At the same time, the regulator can be coupled in such a manner to the heating apparatus that it increases a temperature within the test space. In that case, the refrigerant can continue to leak from the heat exchanger, without the refrigerant refluxing to the heat exchanger against the flow direction.

Further, the expansion element can be stopped by means of a regulator of the temperature control device and operation of the compressor can be continued by means of a regulator of the temperature control device. As in the case above, the regulator can stop refrigerant from flowing through the heat exchanger. At the same time, it can be intended for operation of the compressor to be continued, meaning refrigerant is withdrawn from the heat exchanger independently of the test space being heated. An amount of refrigerant can be decreased in the heat exchanger in this manner, a reflux of refrigerant no longer being possible in the heat exchanger via the stop element.

A pressure of the refrigerant can be determined in the cooling cycle downstream of the expansion element and upstream of the stop element by means of at least one pressure sensor of the regulator, operation of the compressor being able to be continued as a function of a measured pressure. An amount of refrigerant can be reduced even further in the heat exchanger in this manner. Using the pressure sensor, it becomes possible to determine and/or monitor the pressure of the refrigerant in the heat exchanger and to operate the compressor until the heat exchanger only contains a minimal amount of refrigerant. In the event of a leakage of the heat exchanger, only a minuscule amount of refrigerant can enter the test space.

The compressor can be switched off when the pressure ranges from ≤1.5 bar and >1 bar, preferably ≤1.1 bar and >1 bar. Thus, it can be ensured the pressure cannot fall below 1 bar absolute. Provided the heat exchanger and/or the cooling cycle is untight, it can thus be prevented that air is suctioned to the cooling cycle from the environment and/or the test space because of the operation of the compressor. A mixture of air and the refrigerant in the cooling cycle could lead to an explosive mixture being formed in the cooling cycle.

Upon reaching a target pressure in a low-pressure side of the cooling cycle, the compressor can be switched off by means of the regulator and the stop element can be stopped. The compressor can be operated until the target pressure has been reached in the low-pressure side of the cooling cycle, i.e., refrigerant is withdrawn from the heat exchanger in the low-pressure side until the target pressure has been reached. By stopping the stop element, a reflux of refrigerant to the heat exchanger is prevented. The stop element can be a non-return valve or a magnet valve.

Further advantageous embodiments of the method are derived from the descriptions of features of the device described and claimed herein.

In the following, preferred embodiments of the invention are described in more detail with reference to the enclosed drawings.

Figure 1:
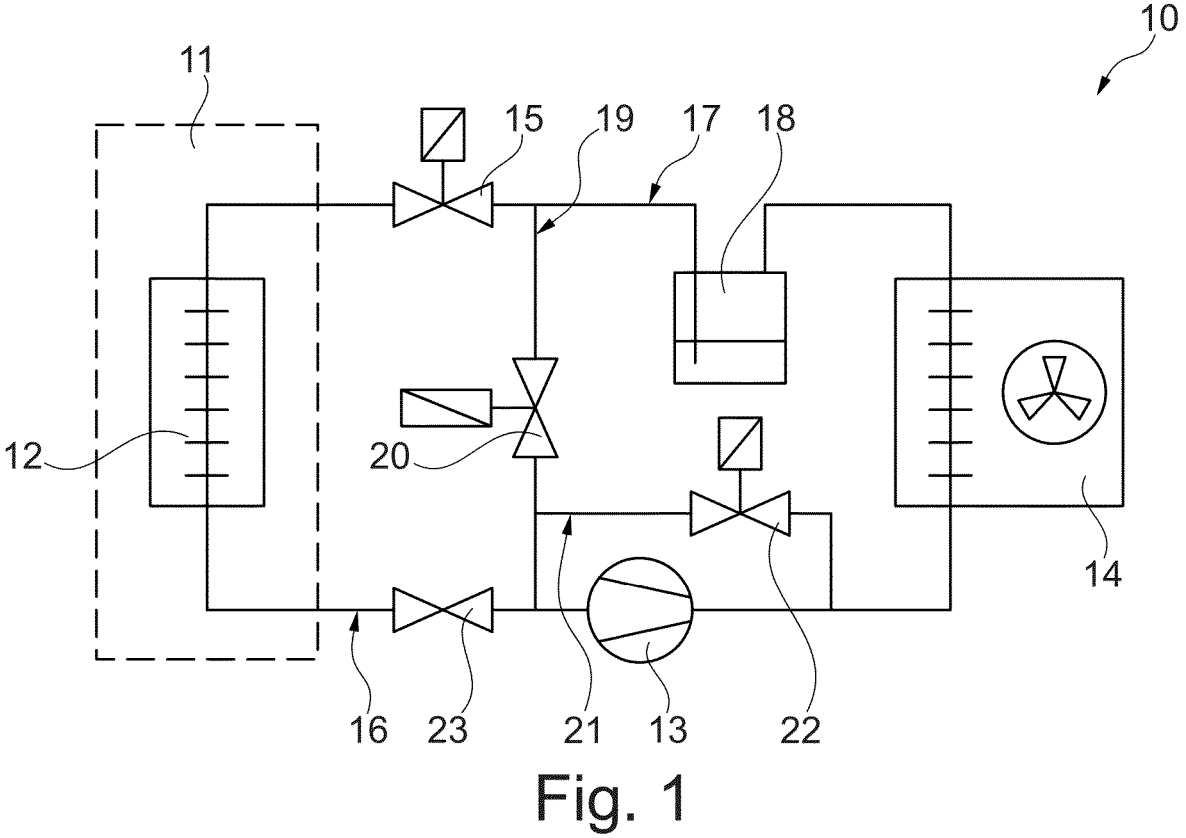
FIG. 1 shows a schematic view of a cooling cycle according to a first embodiment.

FIG. 1 shows a cooling cycle 10 of a test chamber (not shown) for conditioning air together with a test space 11 of the test chamber. Cooling cycle 10 is filled with a refrigerant and has a heat exchanger 12 disposed in test space 11, a compressor 13, a condenser 14 and an expansion element 15. The used refrigerant is inflammable and a hydrocarbon or a refrigerant mixture made of hydrocarbons. The refrigerant is suctioned by compressor 13 on a low-pressure side 16 of cooling cycle 10 and conveyed to a high-pressure side 17 of cooling cycle 10. In this context, the refrigerant flows back to low-pressure side 16 through condenser 14, a storage container 18 and expansion element 15. The refrigerant is expanded when passing expansion element 15 and in this manner cools heat exchanger 12 in test space 11.

Furthermore, cooling cycle 10 comprises a first pressure compensation pipe 19 having a first magnet valve 20, which extends between high-pressure side 17 and low-pressure side 16. First pressure compensation pipe 19 is connected downstream of condenser 14 and upstream of expansion element 15 as well as downstream of heat exchanger 12 and upstream of compressor 13 in a flow direction of the refrigerant. Via the first pressure compensation pipe, compressed refrigerant and/or refrigerant liquefied in condenser 14 can be dosed from high-pressure side 17 upstream of compressor 13 using first magnet valve 20. For instance, operation of compressor 13 can be continued, without refrigerant flowing via expansion element 15. At least, it is possible to regulate a suction pressure on low-pressure side 16. This can take place using a regulator (not shown). Further, a second pressure compensation pipe 21 is provided, which has a second magnet valve 22. Second pressure compensation pipe 21 is connected to cooling cycle 10 downstream of compressor 13 and upstream of condenser 14 as well as downstream of heat exchanger 12 and upstream of condenser 13 directly in a flow direction of the refrigerant. Via second pressure compensation pipe 21, compressed or still gaseous, comparatively hot refrigerant can reflux upstream of compressor 13. Aside from pressure compensation, a suction pressure of compressor 13 as well as a temperature of the refrigerant can also be regulated upstream of compressor 13.

In cooling cycle 10, in particular a stop element 23 is provided, which is disposed downstream of heat exchanger 12 and upstream of compressor 13 in cooling cycle 10 in a flow direction of the refrigerant. Stop element 23 is also disposed upstream of first pressure compensation pipe 19 and second pressure compensation pipe 21. Stop element 23 enables stopping cooling cycle 10, meaning a reflux of the refrigerant can be avoided in heat exchanger 12 against the flow direction of the refrigerant. Thus, no refrigerant can move to heat exchanger 12 against the flow direction. This is particularly advantageous when a temperature is increased in test space 11 and expansion element 15 is closed. Then, heat exchanger 12 is not cooled and a heat expansion of the refrigerant does not take place in heat exchanger 12. The refrigerant can, moreover, be suctioned from heat exchanger 12 by means of compressor 13, meaning comparatively little refrigerant is present in heat exchanger 12. In the event of a leakage of compressor 13 or of cooling cycle 10 within test space 11, only very little inflammable refrigerant can enter test space 11.

Figure 2:
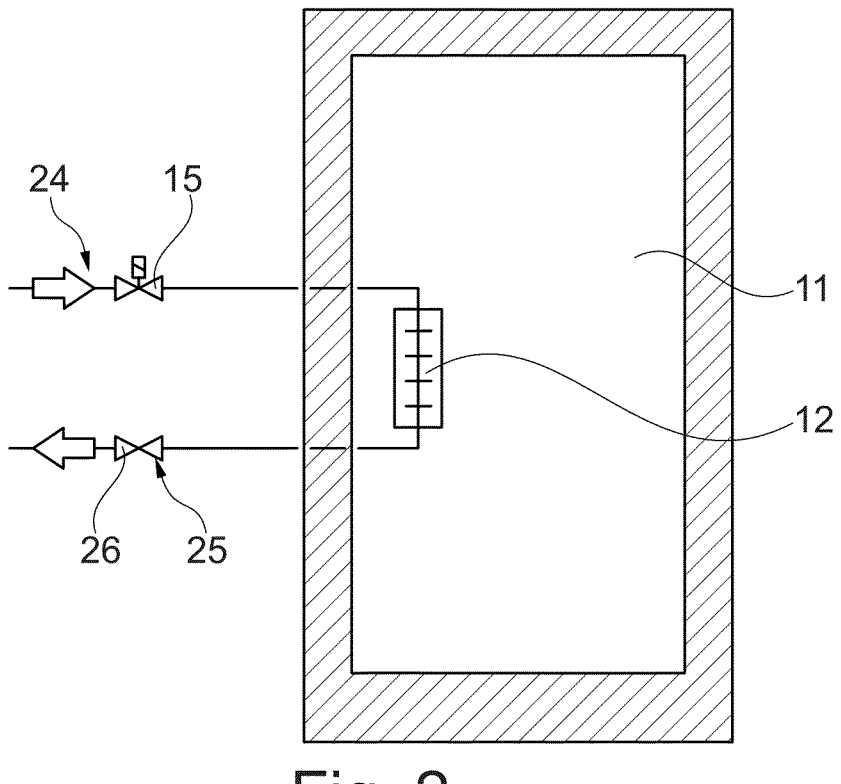
FIG. 2 shows a schematic sectional view of a cooling cycle according to a second embodiment.

FIG. 2 shows a cooling cycle 24, in which, in contrast to the cooling cycle of FIG. 1, a stop element 25 is provided, which is designed as a non-return valve 26. After closing expansion element 15, refrigerant can leak from heat exchanger 12 via non-return valve 26 in the flow direction, e.g., as a result of heat expansion when test space 11 is heated, a reflux of refrigerant to heat exchanger 12 being prevented by means of non-return valve 26. Optionally, it can be intended that heat exchanger 12 is evacuated by means of the compressor (not shown) and/or a pressure is lowered so far in heat exchanger 12 that it essentially corresponds to an ambient pressure and/or does not fall below it.

Figure 3:
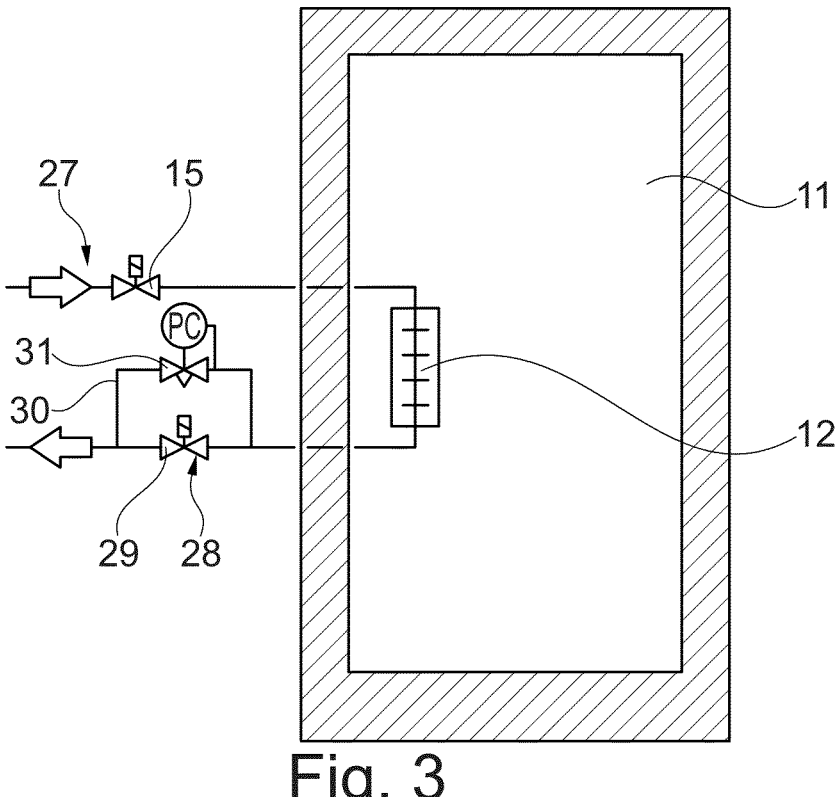
FIG. 3 shows a schematic sectional view of a cooling cycle according to a third embodiment.

FIG. 3 shows a cooling cycle 27 having a stop element 28. In contrast to the cooling cycle of FIG. 1, stop element 28 is formed by a magnet valve 29. Furthermore, a bypass 30 is provided having a pressure relief valve 31. Bypass 30 is connected to cooling cycle 27 downstream of heat exchanger 12 and upstream of magnet valve 29 as well as downstream of magnet valve 29 and upstream of the compressor (not shown) in the flow direction of the refrigerant. After closing expansion element 15, as described above, the amount of refrigerant can be reduced in heat exchanger 12. Subsequently, magnet valve 29 can be closed. In the event of a malfunction of magnet vale 29, it could not be opened, meaning a large amount of refrigerant could flow into heat exchanger 12 after a renewed opening of expansion element 15. This refrigerant can then drain and/or overflow via pressure relief valve 31 when pressure has risen to an inadmissible level within heat exchanger 12.

The invention claimed is:

1. A test chamber for conditioning air, the test chamber comprising a temperature-insulated test space, which is closable to an environment and serves for receiving test material, and a temperature control device for controlling the test space in temperature, a temperature ranging from −40° C. to +180° C. being generable within the test space by the temperature control device, the temperature control device comprising a heating apparatus and a cooling apparatus having a cooling cycle, the cooling cycle having a refrigerant, a heat exchanger disposed in the test space, a compressor, a condenser and an expansion element, the refrigerant being a hydrocarbon or a refrigerant mixture made of hydrocarbons, wherein a stop element is disposed in the cooling cycle directly downstream of the heat exchanger with no other pipes or valves being connected in the section of the cooling circuit between the heat exchanger and the stop element and upstream of the compressor, the stop element being able to stop a reflux of refrigerant in the heat exchanger in the opposite direction of flow, wherein the cooling cycle has a pressure compensation pipe, which extends between a high-pressure side positioned downstream of the compressor and a low-pressure side positioned upstream of the compressor of the cooling cycle, and the pressure compensation pipe is connected between the stop element and the compressor.

2. The test chamber according to claim 1,
wherein
the refrigerant is inflammable and/or free of fluorinated hydrocarbons.

3. The test chamber according to claim 1,
wherein
the stop element is a non-return valve.

4. The test chamber according to claim 1,
wherein
the stop element is a magnet valve, a bypass having a pressure relief valve being disposed in the cooling cycle, the bypass being connected downstream of the heat exchanger and upstream of the magnet valve as well as downstream of the magnet valve and upstream of the compressor.

5. The test chamber according to claim 1, wherein a magnet valve is disposed in the pressure compensation pipe.

6. A method for conditioning air in a temperature-insulated test space of a test chamber, the test space being closable to an environment and serving for receiving test material, a temperature ranging from −40° C. to +180° C. being generated within the test space by a temperature control device of the test chamber, a temperature ranging from −50° C. to +180° C. being generated within the test space by the temperature control device, the temperature control device having a heating apparatus and the cooling cycle having a refrigerant, a heat exchanger disposed in the test space, a compressor, a condenser and an expansion element, the refrigerant being a hydrocarbon or a refrigerant mixture made of hydrocarbons, wherein the cooling cycle has a pressure compensation pipe, which extends between a high-pressure side positioned downstream of the compressor and a low-pressure side positioned upstream of the compressor of the cooling cycle, and the pressure compensation pipe is connected between the stop element and the compressor, the method comprising preventing a reflux of refrigerant in the heat exchanger in the opposite direction of flow by the stop element that is disposed in the cooling cycle directly downstream of the heat exchanger with no other pipes or valves being connected in the section of the cooling circuit between the heat exchanger and the stop element and upstream of the compressor.

7. The method according to claim 6,
further comprising
stopping the expansion element and generating a temperature of +50° C. to +180° C. within the test space by the heating apparatus.

8. The method according to claim 7,
wherein
a pressure of the refrigerant is determined in the cooling cycle downstream of the expansion element and upstream of the stop element by at least one pressure sensor of the regulator, operation of the compressor being continued as a function of a measured pressure.

9. The method according to claim 8, wherein the compressor is switched off when the pressure ranges from ≤1.5 bar and >1 bar.

10. The method according to claim 6, further comprising stopping the expansion element and continuing operation of the compressor.

11. The method according to claim 6, wherein upon reaching a target pressure in a low-pressure side of the cooling cycle, in which the low-pressure side is positioned upstream of the compressor, the compressor is switched off by the regulator and the stop element is stopped.

\* \* \* \* \*